Oct. 13, 1964   A. A. BRAMMERLO ETAL   3,153,183
STATOR FOR TWO SPEED INDUCTION TYPE MOTOR
Filed Sept. 28, 1962
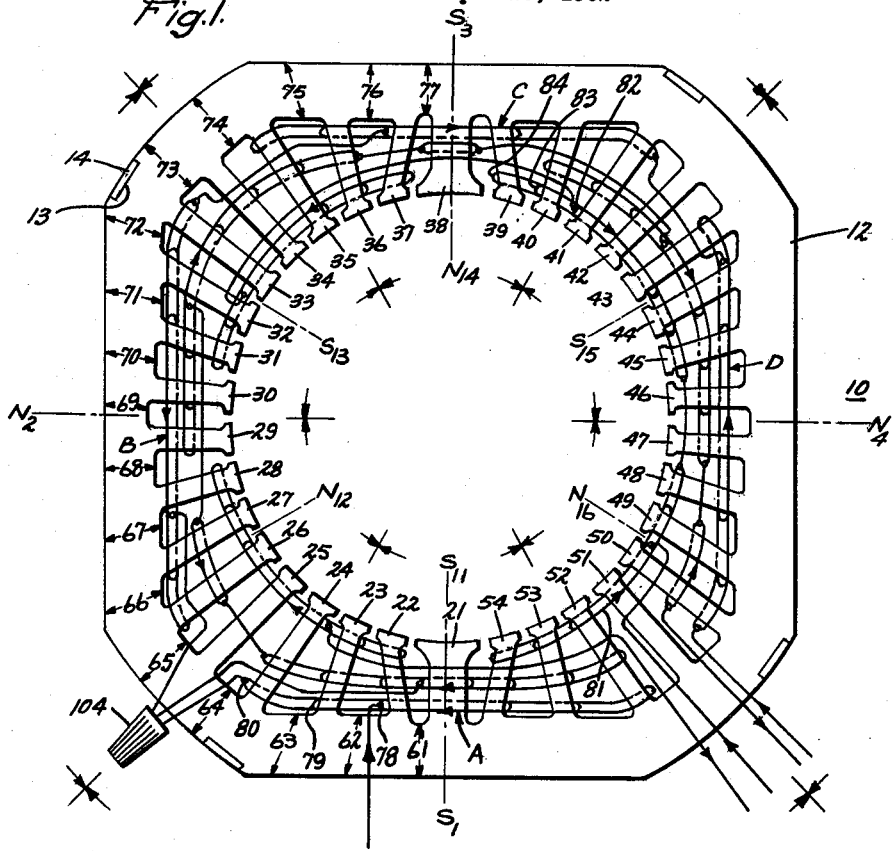
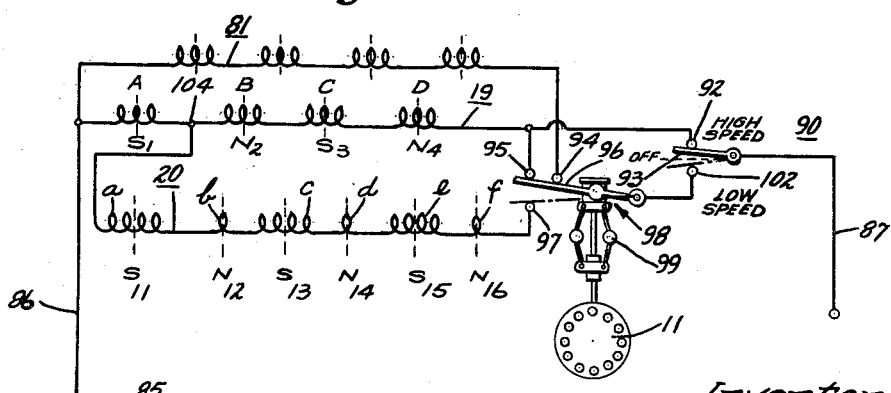
Inventors:
Allen A. Brammerlo,
Harold C. Stout,
by John M. Stoudt
Attorney.

United States Patent Office 3,153,183
Patented Oct. 13, 1964

3,153,183
STATOR FOR TWO SPEED INDUCTION
TYPE MOTOR
Allen A. Brammerlo, Sycamore, and Harold C. Stout,
De Kalb, Ill., assignors to General Electric Company,
a corporation of New York
Filed Sept. 28, 1962, Ser. No. 226,894
5 Claims. (Cl. 318—224)

Our invention relates to alternating current induction motors and more particularly to an improved stator arrangement for use in single phase motors adapted to operate selectively at two different speeds.

Accordingly, it is a general object of the present invention to provide an improved stator for use in a two speed electric motor, and it is a more specific object to provide an improved stator having a winding arrangement capable of providing selective two speed operation.

It is another object of the invention to provide an improved stator for use in a two speed electric motor in which the stator includes a core having magnetic sections related to both of the operating speeds and running poles produced by the stator windings.

It is still another object of the invention to provide an improved two speed motor stator which permits economies in its manufacture without adversely affecting motor performance.

In carrying out the objects in one form, we provide an improved stator arrangement for use in an alternating current split phase two-speed induction motor in which the stator includes a magnetic core and windings for achieving two speed selective motor operation. The core includes a yoke section and a plurality of angularly spaced apart teeth sections of differing cross section widths projecting inwardly from the yoke section to define a plurality of slots, these slots accommodate a first and second main winding, each formed of a number of concentric coils, with the first winding providing four primary magnetic running poles for operating the motor at high speed. The coils in one of the four running poles are connected to the second winding in series relation for energization therewith, and are accommodated in the same slots as some of the second winding coils such that the "common slotted" coils are arranged in additive magnetic relation to produce augmenting M.M.F.'s (magnetomotive force). The additive serially connected coils and the remaining coils of the second main winding, when energized, form six running poles to effect the low speed operation. The depth of the yoke section is generally related to the total flux generated by the four running poles and is of maximum depth in the regions directly over the slots at the extremities of each of the four poles where the total flux is greatest. This depth is more than sufficient to transmit the total flux generated during six pole operation.

On the other hand, the cross section widths of the teeth sections are greatest near the center of each of the six running poles and readily transmit the total flux in both speeds of operation. Among other advantages and features, with this arrangement it is possible to achieve general symmetry for both the windings and the core and to provide a desirable slot space factor for receiving the windings in spite of the fact that the stator is wound for two speed operation. By the present invention, economy of manufacture may be realized without any detrimental effect on performance of the motor.

The subject matter which we regard as our invention is particularly pointed out and distinctly claimed in the concluding portion of this specification. Our invention, itself, however, both as to its organization and method of operation, together with further objects and advantages thereof may best be understood by reference to the following description taken in connection with the accompanying drawing.

In the drawing:

FIG. 1 is a schematic end view of a stator of a single phase motor including the preferred embodiment of the present invention as applied to a motor adapted to operate selectively on either four or six running poles; and FIG. 2 is a schematic circuit diagram for the stator of FIG. 1 showing the selective connection of the individual coils for the four and six pole operation.

Turning now to the drawing in more detail, for purposes of explanation our invention is illustrated as being incorporated in a stator 10 of generally square peripheral configuration with curved corners capable of providing two speed operation in an alternating current single phase split phase induction motor. The motor may include a rotor formed with a standard skewed squirrel-cage secondary winding in the usual way. The rotor is indicated by number 11 in FIG. 2 where it is schematically shown. The stator includes a core 12 built of a preselected number of laminations punched from relatively thin magnetic sheet material, such as common iron. The laminations are conventionally secured together in juxtaposition by four spaced apart keys 13 frictionally received in complementing aligned notches 14 provided near each corner of the core.

As illustrated, the stator core is furnished with thirty-four spaced apart teeth sections 15, each having generally parallel sides, which project inwardly from an integral yoke section 16, to define a number of winding slots 17 and slot entrances 18 at the rotor receiving bore. These slots have top edges provided generally parallel to the outer edge of the core and accommodate two main windings, identified respectively by numerals 19 and 20, which form the primary running poles for the selective two speed operation of the motor. By an important aspect of this invention, the yoke and teeth sections are individually related in construction to the respective running poles created by main windings 19 and 20 for the two speed operation. In the drawing, the radial centers of the four running poles are denoted by characters $S_1$, $N_2$, $S_3$ and $N_4$ while the radial centers of the six running poles have been indicated at $S_{11}$, $N_{12}$, $S_{13}$, $N_{14}$, $S_{15}$ and $N_{16}$. More specifically, we relate the size or radial cross sectional depth of the yoke section directly above the slots primarily to the total flux generated by the high speed operation and relate the size of the teeth sections to the total flux created during low speed running conditions.

In order to describe the manner in which windings 19 and 20 provide the four-six pole selective operation and the structural relation of the core thereto in the illustrated embodiment of the invention, we have identified the thirty-four teeth sections by numbers 21–55 inclusive in FIG. 1. In addition, since the illustrated yoke section is symmetrical about $S_1$–$S_3$ as well as in other respects to be explained later, for reasons of simplicity, only the yoke regions directly over one half of the winding slots in FIG. 1 have been referenced, numbers 61–77 inclusive.

Turning now to main winding 19, it includes four concentric groups of coils, A, B, C, and D, with each group being similarly formed by three coils 78, 79, and 80 spanning, in effect, four, six and eight teeth respectively. The number of turns of wire for each pole may be chosen to approximate a sinusoidal wave form for the flux distribution in the four running poles and to provide M.M.F. balance between the four poles. Normally, a core carrying a winding which provides four pole operation with thirty-six equally and angularly spaced apart slot entrances or teeth. In core 12, the slot entrances 18 are equally spaced apart (ten degrees) with the exception of the entrances adjacent teeth 21 and 38 which are twenty degrees apart. In the illustrated core, the elimination of two conventional slots is permitted and two teeth of enlarged width may be provided.

With respect to main winding 20, it includes six groups of coils, a, b, c, d, and three serially interconnected with the coils of group A for winding 19, which together effect six pole motor operation when main winding 20 is energized. FIG. 2 shows in diagrammatic form one circuit for achieving four-six pole operation.

In the motor of the exemplification, main winding 19 is energized during starting conditions for both speeds of operation. To assist in starting, a start winding 81, having four groups of concentric coils 82, 83, and 84 wound on the core, is angularly displaced by ninety electrical degrees from main winding 19.

The circuit revealed by the solid lines in FIG. 2 displays the winding arrangement under high speed starting conditions. During this condition, main winding 19 and start winding 81 are energized in parallel across A.C. power source 85, through lines 86, 87 and speed selector switch 90. That is, main winding 19 is excited from line 86 through conductor 91 attached to the high speed side 92 of switch 90 of the single pole-double throw variety, through the selector arm 93 of switch 90 and hence to line 87. With respect to the start winding, it is connected between switch 90 and line 86 through contact sides 94 and 95, closed by movable arm 96 of a centrifugally operated switch 98. When the motor comes up to high speed, a standard centrifugal mechanism 99, operatively connected to switch 98, moves arm 96 to the position indicated by the broken lines, in engagement with switch side 97, thereby deenergizing start winding 81. Consequently, high speed running operation is provided by the four running poles created by excited main winding 19.

To cease motor operation, selector switch arm 93 is moved to the "off" position and centrifugal mechanism 99 will return movable arm 96 to the unactuated position, closing contact sides 94 and 95 of switch 98. For starting the motor under low speed conditions, movement of selector switch arm 93 to the low speed side 102 of speed selector switch 90 will establish a parallel circuit of the start and main windings 80 and 19, between lines 86, 87.

After the motor reaches the speed at which centrifugal mechanism 99 actuates arm 96 into contacting engagement with switch side 97, poles $N_2$, $S_3$, and $N_4$ of winding 19 and the entire start winding 80 will be disconnected from the power source, leaving only the coils of pole $S_1$ of main winding 19 energized in series circuit relation with the now excited main winding 20, the connection being indicated at 104. It will be seen from FIG. 1 that the coils of group A, are disposed on the core such that their radial center is common with the radial center of the coils of group "a" for winding 20, and certain coil sides of each group are accommodated in the same slots. With the current flowing through the coils as shown by the arrows in the drawings, that is, in the same relative direction through the "common slotted" coils of coil groups a and A for the respective main windings, and in an alternate direction through coil groups b, c, d, e, and f of winding 20, six primary running poles will be formed in the manner most clearly revealed in FIG. 1. Coils in coil groups "a" and A which are located in the common slots will in effect be in additive magnetic relation and produce augmenting M.M.F.'s (magnetomotive force). This allows the common slotted coils of coil group "a" to include less wire turns than the corresponding coils in groups c and e, and still provide six pole symmetry in both wire turns and coil deployment when the number of turns for the six running poles are properly chosen.

Still referring to FIG. 1, in accordance with one aspect of our invention, the yoke section preferably is of minimum magnetic depth in the regions directly above the slots at the center of each of the four running poles $S_1$, $N_2$, $S_3$ and $N_4$ and progressively increases in depth to a maximum dimension at the pole extremities. We prefer to relate these yoke regions to the total lines of flux generated by main winding 19 under running conditions, the strength of the flux in the yoke section being greater at the pole extremities. In addition, it is preferable that each yoke region is just under the saturation point at these locations. The total flux generated in the yoke section at each of the four running poles will be, in most instances, of higher intensity at the same yoke region for that created at the six running poles $S_{11}$, $N_{12}$, $S_{13}$, $N_{14}$, $S_{15}$ and $N_{16}$ during low speed running conditions. Thus, the yoke cross section depth at any given yoke region should, generally speaking, be more than sufficient to accommodate the total flux of the six running poles. In the core shown in FIG. 1, yoke section 12 therefore gradually increases in width directly over the slots from a minimum value at regions 70 for poles $N_2$ and $N_4$ and 77 at poles $S_1$, $S_3$, to a maximum dimension at regions 64, 65, 73 and 74 located at each extremity of the four poles.

In a somewhat converse manner, we provide the teeth adjacent the center of each of the six primary running poles with the largest cross section widths, at any given radius, and in the preferred form, the teeth progressively decrease in width from the greatest dimension near the center of each of the six poles to a minimum value adjacent each of the six pole extremities shown in FIG. 1 by arrows and radial lines in the rotor bore. This arrangement, in actual practice, has proven to be very satisfactory for transmitting the flux generated by the windings under both motor operating speeds. For instance, in one motor stator constructed in accordance with FIG. 1, teeth 32, 33, 43, 44, 49, and 50 each included approximately 30,000 total lines of flux for six pole operation, but slightly less than that when winding 19 was energized to effect four pole running conditions. Enlarged teeth 21 and 38 included about double that flux total under four pole running speed, the example motor had a rated speed of 1725 r.p.m. with a breakdown torque of 45 oz. feet. At six pole operation (low speed) its breakdown torque was 41 oz. feet and a rated speed of 1140 r.p.m.

The construction of the present invention not only provides enhanced performance at both selective speeds of operation, but in addition allows economies in manufacture. For instance, it is possible to construct the core of the illustrated and preferred embodiment with general quadrature symmetry in both yoke and teeth sections for reasons of manufacturing economy while still retaining the performance benefits of our invention in both speeds of operation. For convenience of presentation, example dimensions will be used for the quadrature lying angularly between $N_2$–$S_3$ set out below in tabulated form:

| Yoke Regions | | Teeth Sections | |
|---|---|---|---|
| Number in Fig. 1 | Example dimensions in inches | Number in Fig. 1 | Example dimensions in inches |
| 69 | .305 | 30 | .148 |
| 70 | .358 | 31 | .148 |
| 71 | .410 | 32 | .163 |
| 72 | .425 | 33 | .163 |
| 73 | .435 | 34 | .148 |
| 74 | .435 | 35 | .126 |
| 75 | .425 | 36 | .134 |
| 76 | .410 | 37 | .148 |
| 77 | .358 | 38 (½ of tooth) | .1605 |

All of the winding receiving slots are formed with sufficient winding accommodating area to receive the coils of the three windings, to realize economy and ease in winding placement. Thus, the slot space factor, an indication of the difficulty of distributing the winding turns in the slots can readily be maintained below 60%.

It will be appreciated, of course, that the most desirable dimensions and optimum relationships of the individual yoke regions and teeth sections will be governed by the flux saturation characteristics of the magnetic material used, the exact windings employed and the overall size of the motor. Moreover, the foregoing optimum yoke and teeth relationships may be varied while still obtaining the advantages of our invention. Furthermore, while our improved stator construction has been shown as embodied in a stator wound for four and six pole selective operation, it should be appreciated from the foregoing by those skilled in the art that the principles of the invention are equally applicable to other two speed polar arrangements. Likewise, of course, the inventive concepts disclosed above may, if desired, be incorporated in stator cores having circular rather than rectangular configurations.

It will therefore be apparent to those skilled in the art, that while we have shown and described what at present is considered to be the preferred embodiment of our invention in accordance with the patent statutes, changes may be made in the structure disclosed without actually departing from the true spirit and scope of this invention, and we therefore intend to cover in the following claims all such equivalent variations as fall within the invention.

What we claim as new and desire to secure by Letters Patent of the United States is:

1. In a single phase induction type motor for operation selectively at two speeds, a stator including magnetic core comprising a yoke section and a plurality of angularly spaced apart teeth sections together defining a number of slots; a first main winding comprising a plurality of coils positioned in said slots to form at least two primary magnetic running poles for operating the motor at one speed; a second main winding having a plurality of coils positioned in said slots; at least a part of the coils of one primary running pole of said first winding connected in series relation with said second winding for energization therewith; said last-mentioned coils of said one pole being located in the same slots of the core as coils of said second main winding and being arranged in additive magnetic relation therewith when said second winding is energized; said additive serially connected coils of both windings, together with the remaining coils of said second winding, defining an even number of primary running poles in excess of the number of the first winding running poles; the yoke section having a minimum magnetic depth in the region directly over the slots near the center of each of the lesser number of running poles and a maximum depth adjacent the region directly over the slots near the extremities of each of said last-mentioned poles; and the teeth sections located adjacent the respective centers of the higher number of running poles being greater in width than those respectively located at the extremities of the same poles.

2. In a single phase induction type motor for operation selectively at two speeds, a stator including a magnetic core comprising a yoke section and a plurality of angularly spaced apart teeth sections of differing widths defining a number of slots; a first and second main winding, each comprised of a plurality of coils, positioned in said slots to form selectively at least two primary running poles and a greater even number of primary running poles of alternating polarity for operating the motor at either of two speeds; said yoke section having a maximum depth in the regions directly over the slots near the extremities of each of the lesser number of primary running poles; and said teeth sections located adjacent the respective pole centers of said greater even number of running poles being greater in width than those respectively positioned at the extremities of the same poles.

3. In a single phase induction type motor for operation selectively at two speeds, a stator including a magnetic core comprising a yoke section and a plurality of angularly spaced apart teeth sections projecting inwardly from the yoke section to define a corresponding number of slots; a first main winding comprising a plurality of coils positioned in said slots; a second main winding having coils disposed in said slots; said windngs selectively forming at least two running poles and an even number of running poles of alternating polarity in excess of the first mentioned poles for operating the motor at either of two speeds; said yoke section having a maximum depth in the regions directly over the slots near each of the extremities of the lesser number of running poles; and said teech sections varying in cross section widths from a minimum near the extremities of the greater number of running poles to a maximum adjacent the centers of said last-mentioned running poles.

4. In a single phase induction type motor for operation selectively at two speeds, a stator including a magnectic core comprising a yoke section and thirty-four angularly spaced apart teeth sections of varying widths projecting inwardly from the yoke section to define thirty-four slots two diametrically disposed teeth being substantially greater in width than the remainder of the teeth sections; first and second main windings each comprising a plurality of coils positioned in said slots; said windings arranged to form selectively four and six running poles of alternating polarity for operating the motor at either of two speeds; a start winding having coils concentrically disposed in said slots electrically displaced from said first main winding, with one side of the outer coils accommodated in the slots adjacent the substantially larger teeth; said yoke section having a minimum magnetic depth in the region directly over the slots near the center of each of the four running poles and a maximum depth adjacent the yoke region directly over the slots adjacent the outer portions of the same poles; and said larger teeth sections being located at the pole centers for two of each of the four and six running poles, with the teeth sections progressively increasing in width from a minimum adjacent the pole extremities of the six running poles to a maximum near the radial centers of the same poles.

5. In a single phase induction type motor for operation selectively at two speeds, a magnetic core comprising a yoke section and a plurality of angularly spaced apart teeth forming a number of slots; a first main winding positioned in said slots to form four primary magnetic running poles of alternating polarity for operating the motor at one speed; each of said poles comprising a plurality of concentrically distributed coils; a second main winding having a number of coils positioned in said slots to form a plurality of coil groups with more than one group having concentrically arranged coils; the concentric coils of one pole of said first winding connected in series relation with said second winding for energization therewith and carried in the same slots as the concentric coils of one of said coil groups of said second winding, with the radial centers for the respective concentric coils being approximately common; said last-mentioned concentric coils for both windings arranged in additive magnetic relation to provide a running pole of the same polarity adjacent said radial centers when said second winding is energized; said additive serially connected concentric coils, together with the other coils of said second winding, defining six primary running poles for operating the motor at a second speed; the yoke section of said core generally increasing in magnetic depth in the regions over the slots, from a minimum dimension near the centers of the four poles to a maximum adjacent each of the four pole extremities; and the teeth sections of said core located near the center of each of the six running poles being of greater cross section than the teeth sections adjacent the extremities of each of the six poles.

No references cited.